INVENTOR.
Jerry R. Estes

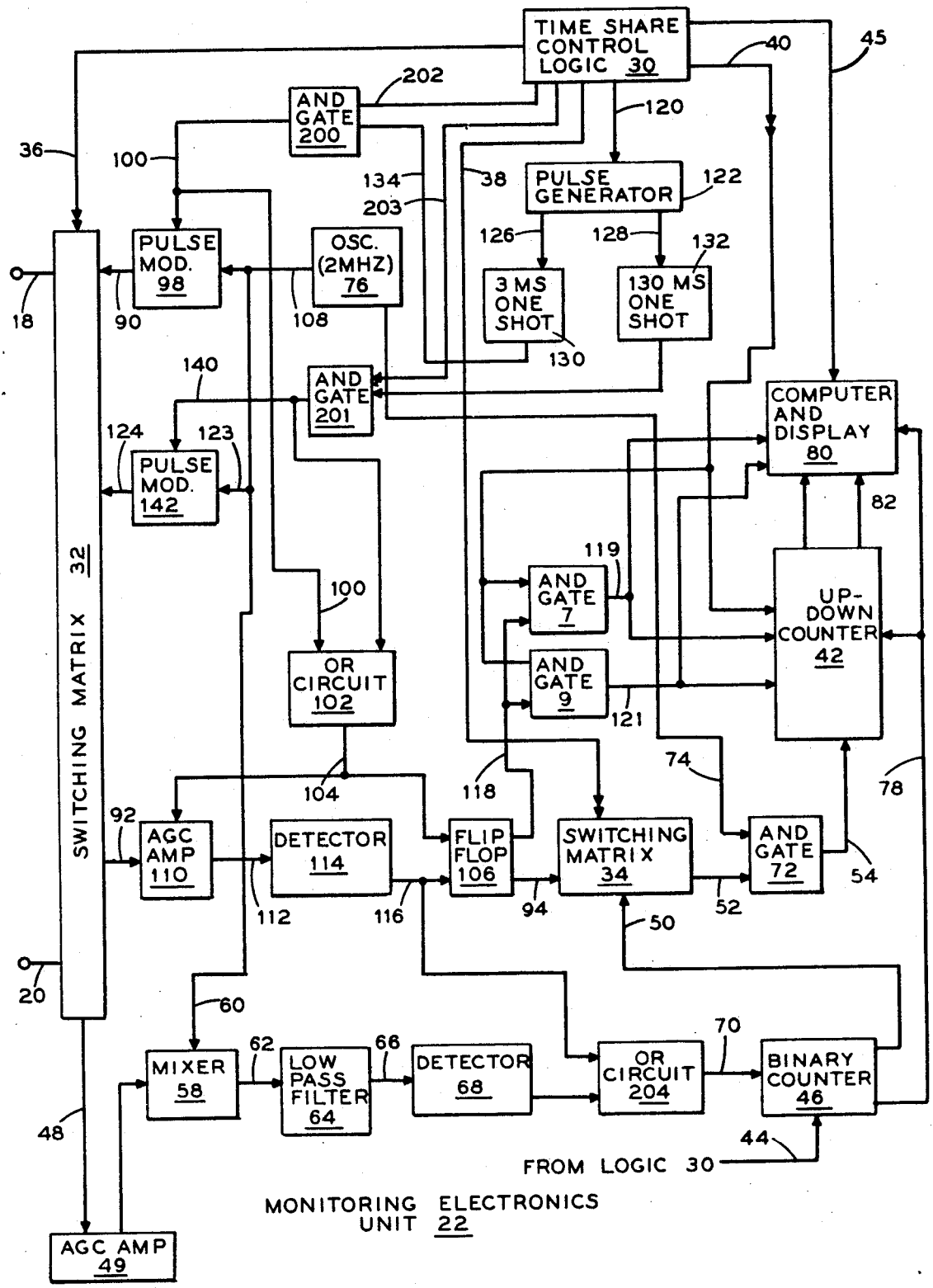

3,606,879
MONITORING THE PHYSIOLOGICAL PHENOMENA OF CHILDBIRTH WITH ULTRASOUND
Jerry R. Estes, Boulder, Colo., assignor to Electro Medical Systems, Inc., Englewood, Colo.
Filed June 17, 1968, Ser. No. 737,608
Int. Cl. A61l 5/02
U.S. Cl. 128—2.05R
11 Claims

ABSTRACT OF THE DISCLOSURE

An ultrasonic apparatus for monitoring, during childbirth, the physiological phenomena of fetal heartbeat, cervical dilatation and uterine contraction. Fetal heartbeat is monitored by indicating changes in the frequency of ultrasonic waves passing through the fetus due to the Doppler effect caused by movements of the fetal heart or blood. Uterine contraction is monitored by indicating changes in transit time of pulses of ultrasonic energy. To measure cervical dilatation, two reflectors are clipped to the mouth of the cervix and ultrasonic pulses from an external transducer are directed to the reflectors. The transit time difference between the reflected signals indicates the dilatation.

BACKGROUND OF THE INVENTION

This invention pertains to monitoring physiological phenomena associated with childbirth and more particularly to methods and apparatus for monitoring fetal heartbeat, cervical dilatation and uterine contractions during childbirth.

During labor, certain physiological phenomena manifest themselves. These phenomena such as fetal heartbeat, cervical dilatation and uterine contractions are used as guides by the attending physician to indicate the time of childbirth and to indicate whether any special instruments or aids will be necessary.

In particular, the quality of the fetal heartbeat can be used to indicate whether special emergency equipment will be needed. Heretofore, the detection of fetal heartbeat required complicated and sensitive equipment because the weak amplitude of such heartbeat is in great part masked by the much stronger amplitude of the maternal heartbeat.

It is accordingly an object of one aspect of the invention to provide improved methods and apparatus for detecting fetal heartbeat without the masking effect of maternal heartbeat.

It is another object of this aspect of the invention to provide methods and apparatus for monitoring fetal heartbeat which produce no discomfort of the patient and no harn to the unborn child or mother.

Briefly, this aspect of the invention contemplates monitoring fetal heartbeat by passing pulsed ultrasonic energy waves of known frequency through the fetus and sensing for deviations in the known frequency due to Doppler effects introduced by movements of the fetal heart or blood.

Cervical dilatation gives the attending physician good evidence upon which to estimate the time of birth. Usually, the attending physician makes personal manual examination of the dilatation from time to time. However, it has become apparent that such examination is discomforting to the mother, time consuming for the physician and the risk of infection is increased. Then, there is always the problem of a precipitous birth which may occur between such manual examinations. Accordingly, there have been attempts to provide apparatus for constantly monitoring the dilatation. The first of these apparatuses was a mechanical arrangement which was coupled to the cervix and crowded the birth passage. It became immediately apparent that such a monitoring device had many physical disadvantages. Therefore, apparatus was proposed wherein elements of an electrical circuit and oscillator were clipped to the cervix. However, such apparatus must be electrically and physically connected to external circuitry and voltage sources. Such connections create their own set of problems.

It is accordingly an object of another aspect of the invention to remotely measure cervical dilatation.

It is another object of this aspect of the invention to provide apparatus which requires no mechanical or electrical connections through the birth passageway to the cervix.

Briefly, this aspect of the invention contemplates transmitting pulses of ultrasonic energy toward two different regions of the mouth of the cervix. The pulses are reflected by those regions and the difference in the time of receipt of the reflected pulses is used to indicate the degree of dilatation.

Uterine contraction also gives the attending physician an indication of abnormalities and significant changes in the labor process such as: tetanic contractions wherein the uterus remains in contraction for an overly long period, and the cessation of contraction associated with the descent of the fetus. Heretofore, such contractions were monitored either by the mother or an attending nurse. It is too well known that such monitoring is unreliable. Too frequently the delivering physician has been called too early or too late.

It is accordingly an object of another aspect of the invention to provide an improved and reliable method of monitoring uterine contractions.

It is another object of this espect of the invention to provide uterine contraction measuring apparatus wherein monitoring such contractions in no way inconvenienced the mother or endangers the fetus.

Briefly, this espect o fthe invention contemplates transmitting ultrasonic energy pulses through the body in the uterine region and measuring changes in transit time due to increases in the cross-section of the uterus during contractions.

It should be noted that by simultaneously monitoring these three phenomena, the physician can correlate their interaction and obtain more information than by merely monitoring the separate phenomena.

Other objects of the invention are to perform more than one of such monitorings substantially simultaneously with integrated apparatus utilizing time sharing techniques.

Other objects, the features and adavntages of the invention will be apparent from the following detailed description when read with the accompanying drawings which show apparatus for practicing the invention.

BRIEF DESCRIPTION OF THE DRAWINGS

In the drawings
FIG. 3 is a block diagram of the monitoring apparatus of FIG. 1.

DESCRIPTION OF THE PREFERRED EMBODIMENTS

Figure 1:
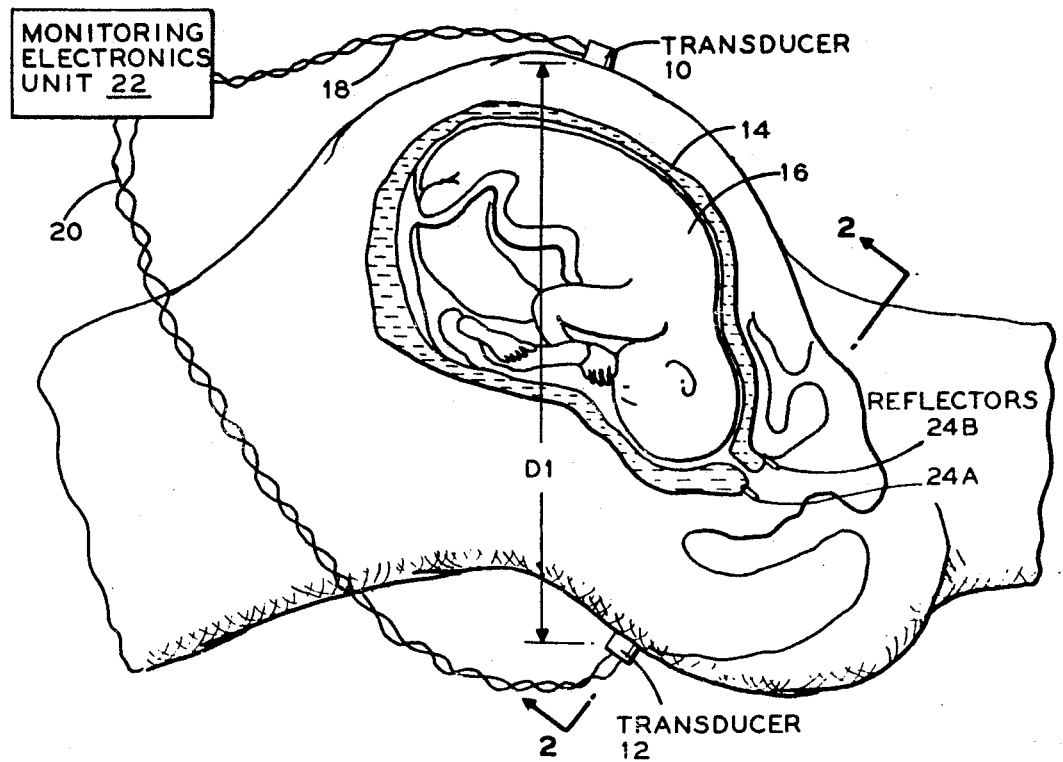
FIG. 1 is a cross-sectional view of those portions of the pregnant female anatomy associated with childbirth with the monitoring apparatus of the invention applied thereto.
Figure 2:
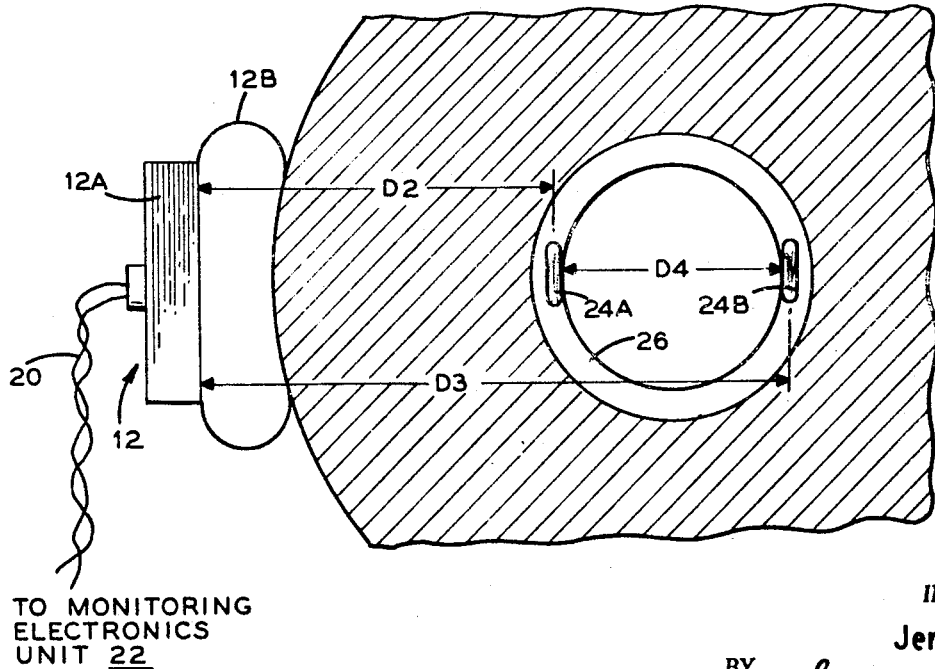
FIG. 2 is an enlarged view taken along the line 2—2 of FIG. 1.

First refer to FIGS. 1 and 2 which show those portions of a pregnant female pertinent to a childbirth phenomena monitoring procedure. In order to monitor fetal heartbeat and uterine contractions, two ultrasonic transducers 10 and 12 are affixed to the abdomen and the back of the mother respectively. It is necessary that a line connecting these transducers pass through the uterus 14 and the fetus 16. Although the transducers will hereinafter be described, it is only necessary for the present to know that each transducer is capable of transmitting an ultrasonic energy signal upon receipt of an electrical signal and vice-versa. Each of the transducers 10 and 12 is connected via signal leads 18 and 20 respectively to the monitoring electronics unit 22.

In order to measure fetal heartbeat, unit 22 emits a 2 mHz. electrical signal which can be pulse modulated at a rate of 100 pulses per second and a width of 130 microseconds via line 18 to transducer 10 which converts the signal to a wave train of ultrasonic energy having a carrier frequency of 2 mHz. (2 megacycles per second). The ultrasonic energy traverses a path from transducer 10, via the fetus 16, where it is reflected back to transducer 10. When the ultrasonic wave is reflected by the heart of the fetus and any movement such as a movement of the heart valves or of the blood itself causes a change in path length which in turn results in a Doppler shift effect in the ultrasonic wave causing a change in its frequency. The ultrasonic wave received at transducer 10 is converted to an electric signal which is fed via signal lead 18 to unit 22. Within unit 22 the frequency of the received signal is compared with the original 2 mHz. signal to give different frequencies which indicates fetal heartbeat.

To measure uterine contraction, unit 22 transmits different electric signals via line 18 to transducer 10. These signals can be pulse modulated 2 mHz. carrier signals having a pulse repetition rate of 100 per second and a pulse duration time of 3 microseconds. As ultrasonic pulses, they would have a distance resolution of about 0.25 cm. since ultrasonic propagation time in human tissue is approximately 13.5 microseconds/cm. The signals are converted by transducer 10 to pulses of ultrasonic energy having the same time parameters, and are transmitted via the uterine region to transducer 12. The ultrasonic energy pulses received by transducer 12 are converted to electric pulses and fed via signal leads 20 to unit 22. In unit 22 a time interval is measured, which commences when a pulse signal is transmitted to transducer 10 and terminates when the related pulse signal is received from transducer 12. This time interval is effectively the transit time of the ultrasonic energy pulse through the mother or distance between the transducers. It is known that when there is a uterine contraction, there is a shortening of the uterus and a resulting increase in its cross-section (and an increase in the distance D1 between the transducers). Thus, by performing periodic measurements of the distance D1 in the above described manner, there will be noted rhythmic deviations of the distance from a "steady state" value. These deviations are the monitored manifestation of the contractions. Their frequency can be measured and/or recorded to give not only a real time indication of the contractions but also a permanent record thereof.

It should now be apparent that since the same transducers are used for all of the monitoring operations, one can multiplex the procedure by time sharing of the transducers between the operations so that there is a simultaneous monitoring action.

In order to monitor cervical dilatation the attending physician clips, using well known medical clips, a reflector 24A in the form of a small target plane of a surface reflective material such as stainless steel or tantalum, to one region of the mouth of the cervix 26, and clips a similar reflector 24B to another region of the mouth of the cervix 26. These reflectors are in alignment with transducer 12 and can be inserted several weeks before childbirth. The transducer 12 is actually fixed to the back of the mother in the plane of the mouth of the cervix as shown in FIG. 2 so that reflectors 24A and 24B are displaced by a different distance, D2 and D3 respectively from the transducer 12. Transducer 12 comprises a piezoelectric crystal transducer 12A tuned to 2 mHz., and a suitable coupling unit 12B. Such transducers are well known in the art, such as the barium titanate type. It should be noted that transducer 10 is similarly constructed.

Cervical dilatation is measured by using a ranging technique similar to that employed for measuring uterine contraction, i.e., measuring the transit time of ultrasonic energy pulses. First, a pulse modulated carrier signal which can have a carrier frequency of 2 mHz. is transmitted from unit 22 via leads 20 to transducer 12 where it is converted to a pulse of 2 mHz. ultrasonic energy. This energy travels toward the cervix 26 and is reflected by reflector 24B and by reflector 24A. The reflected pulses are received by transducer 12 and converted to electric pulse signals which are fed via leads 20 to unit 22. In a manner similar to that described for uterine contraction the difference in trip transit time between the pulses reflected from transducers 24A and 24B is measured and stored, giving an indication of distance D4.

Again it should be apparent that the cervical dilatation monitoring can be multiplexed with either or both of the two above described monitoring operations so that all three operations can be simultaneously performed using common apparatus.

There will now be described with respect to FIG. 3, such common apparatus. Before describing the apparatus, several comments are in order. Most of the elements are standard "off the shelf" items. For such items only their function will be described. Other of the items such as the switching matrices and the control logic comprise standard elements. However, the standard elements will be cited and a functional description of the items should make it apparent to a man skilled in the art how the elements are assembled. For the sake of simplicity, all signal leads are shown as one line. However, some of the signal leads are actually cables of several wires, such cables will be designated with double-arrowheaded lines. In addition, only the purely logical functions are shown. However, good engineering practice will normally require power amplifiers to drive the transducers and high gain amplifiers to raise the amplitude of the electric signals transmitted by the transducers to usable signal levels.

Time share control logic 30 is basically a device which assigns the three monitoring operations to sequential time slots of say, ten seconds each. It can be a multibank motor driven stepping switch having three positions, one for each of the monitoring operations. In each position, it emits control signals which can be generated from contacts connected to appropriate voltage sources. It should be realized that the disclosure is not limited to stepping switches, since electric ring counters and the like could just as well be used. The switching matrices 32 and 34 can be either arrays of relays or diode "and" gates which open and close in response to control signals from control logic 30. The remaining elements will be described as they enter into the description of the operation of the apparatus.

Bearing in mind that the monitoring operations sequentially occur in sequential time slots, it will be assumed the sequence is fetal heartbeat, uterine contraction and cervical dilatation.

When time share control logic 30 steps to position 1 associated with fetal heart rate, it transmits signals via line 36 to matrix 32, via line 38 to matrix 34, via line 40 to up-down counter 42, via line 44 to binary counter 46 via line 203 to open AND gate 201, via line 120 to pulse generator 122 via line 45 to display 80. Matrix 32 establishes a path between line 124 and line 18 to transducer 10. Matrix 34 establishes a path between lines 50 and 52. Binary counter 46 is cleared to the zero state wherein it transmits no signal to line 50. Up-down counter 42 is cleared to a count of zero. It will normally act as an up counter, i.e., unit accumulates pulses received from line 54 unless specifically signalled to act as a down counter. Display 80 is conditioned to display a representation of fetal heart beat. Pulse generator 122 transmits, via line 128, pulses having a rate of 100 p.p.s. These pulses are fed via line 128 to trigger one shot multivibrator 132 which emits pulses during a duration of 130 μs. via AND gate 201 to pulse modulator 142.

A 2 mHz. wave signal generated by oscillator 76 (a conventionl sinusoidal oscillator) is fed via line 108, line 123, pulse modulator 142, line 124, matrix 32 and leads 18 to transducer 10, where it is converted to a 2 mHz. ultrasonic signal. Pulse modulator 142 modulates the 2 mHz. signal with a 130 μs. pulse at a rate of 100 p.p.s. The ultrasonic signal passes through the fetus where it is Doppler frequency shifted in the heart of the fetus and is reflected back to transducer 10 which converts it to an electrical signal. This electrical signal is fed via line 18, matrix 32 and line 48 to the AGC amplifier 49 which compensates for tissue attenuation of the ultrasonic wave. The output of the AGC amplifier is fed to one input of mixer 58 whose other input receives 2 mHz. signal from oscillator 76 via line 60. Mixer 58 of conventional design heterodynes (zero beats) the two signals received at its inputs and transmits a signal having components with frequencies equal to the sum and difference of the frequencies of the input signal. It should be apparent that the component with difference frequency is a measure of the Doppler shift. The output of the mixer 58 is connected via line 62 to low pass filter 64 so that only the difference frequency component is transmitted via line 66 to the input of detector 68. The output of filter 64 is an audio pulse whose presence represents a single heart beat of the fetus. Detector 68 can be a Schmitt trigger which converts this pulse to one having a sharp leading edge and a constant amplitude. The leading edge of this pulse triggers binary counter 46 to the set state, the input of counter 46 being connected via line 70 and OR circuit 204 to the output of detector 68. Accordingly a signal is transmitted via line 50, matrix 34 and line 52 to the control input of AND gate 72 which opens and establishes a path between lines 74 and 54. The 2 mHz. signal from oscillator 76 (a standard sinusoidal oscillator) is thus fed into counter 42 wherein each cycle of the signal is accumulated. It should be noted that each cycle represents 0.5 microsecond. Counter 42 can be a conventional cascade chain of binary counters which is controlled to unit add or unit subtract as each pulse is received.

The next audio pulse, representing the next heart beat, which passes from filter 64 and detector 68, clears the binary counter 46 terminating the signal on line 50. Accordingly, AND gate 72 closes and a count has been accumulated in counter 42. In addition, as binary counter 46 is restored, it transmits a pulse via line 78 to counter 42 and display 80. When display 80 receives the pulse it accepts the signals on lines 82 representing the accumulated count. These signals can be fed to a D-to-A converter which drives a meter suitably calibrated in units of heart beat or they can be digitally processed to give a digital readout of the same. When counter 42 receives the pulse on line 78 the counter is cleared for the next cycle of operation. Of course, the clearing occurs after display 80 has accepted the signals.

When the control logic 30 steps to position 2 and uterine contraction is monitored, control logic 30 transmits control signals via line 120 to pulse generator 122 via line 36 to matrix 32, via line 38 to matrix 34, via line 40 to counter 42 and AND gate 7, via line 202 to AND gate 200 and via line 45 to display 80. The signal on line 120 activates pulse generator 122 which can be a gated-blocking oscillator which transmits pulses on line 126 to one-shot multivibrator 130. The pulses have a repetition rate of 100 pulses per second and a duration of three microseconds. The signal on line 36 causes matrix 32 to connect line 90 to line 18 and to connect line 20 to line 92. The signal on line 38 causes matrix 34 to connect line 94 to line 52. The signal on line 40 clears the counter 42 to zero and opens AND gate 7. The signal on line 45 sets up display 80 for monitoring uterine contraction.

Now, when a pulse is emitted by pulse generator 122 it passes via line 126 to one-shot multivibrator 130. The output of one-shot multivibrator 130 is connected, via AND gate 200 and line 100 to the control input of pulse modulator 98 and also via line 100, OR circuit 102 and line 104 to the set input of flip-flop 106. Flip-flop 106 is a bistable device which is switched on or set when it receives a pulse at its set input and switched off or cleared when it receives a pulse at its clear input. An OR circuit is merely a buffering device which transmits from ts output a signal present on any one of its inputs. Pulse modulator 98 can be a gating device which transmits from its output the signal received at its input as long as a signal is present at its control input.

The setting of flip-flop 106 by a pulse causes it to generate a signal which passes via line 94, matrix 34 and line 52 to AND gate 72 which opens. A time interval starts and the 2 mHz. signal passes from oscillator 76 via line 74, AND gate 72 and line 54 to the input of counter 42 which starts counting the cycles. At the same time, the same pulse from pulse generator 130 opens pulse modulator 98 and for a packet of 2 mHz. signal from oscillator 76 passes from line 108 to line 90 and switching matrix 32 and leads 18 to transducer 10. The packet is changed to a pulse of ultrasonic energy which passes through the patient and is picked up by transducer 12 where it is converted to an electrical pulse. This pulse passes via leads 20, matrix 32 and line 92 to AGC amplifier 110. The output of AGC amplifier 110 which is a pulse is fed via line 112 to detector 114 (similar to detector 68). The shaped pulse from detector 114 is fed via line 116 to the clear input of flip-flop 106 terminating the signal on line 94. Accordingly, AND gate 72 closes, and counter 42 holds the final accumulation representing the elapsed time between when the pulse left transducer 10 and when the pulse arrived at transducer 12, or the distance between the transducers. In addition, as flip-flop 106 is restored it transmits a pulse via line 118, AND gate 7 and line 119 to counter 42 and display 80. It should be noted gate 9 is closed at this time. When display 80 receives the pulse it accepts the signals on lines 82 representing the accumulated count. It can process the signals as previously described for the fetal heart beat monitoring operation. Counter 42 is then cleared.

When the time share control logic 30 steps to position 3, associated with cervical dilatation, it transmits a control singal via line 36 to switching matrix 32, a control signal via line 202 to AND gate 200, a control signal via line 38 to switching matrix 34, a control signal via line 40 to up-down counter 42 and to AND gate 9, and a control signal via line 45 to computer and display 80.

The control signal received by matrix 32 causes the matrix to connect line 90 to lead 18 and to connect lead 20 to line 92. Switching matrix 34 connects line 94 to line 52 upon receipt of the control signal. The signal on line 45 conditions computer and display 80 to monitor cervical dilatation.

For the sake of completeness, pulse generators 130 and 132 will now be described. Each of these pulse generators can be a triggered "one shot" multivibrator which whenever it receives a signal at its input will emit one pulse occurring in time with the leading edge of the received signal. The output pulse can have a duration of 3 microseconds for generator 130 and 130 microseconds for generator 132.

One cycle of operation will now be described. A 2 mHz. wave generated by oscillator 76 is fed via line 108, pulse modulator 98, matrix 32 and leads 18 to transducer 12 where it is converted to a 2 mHz. ultrasonic signal. Pulse modulator 98 modulates the 2 mHz. signal into packets of energy with a 3 microsecond duration at a repetition frequency of 100 pulses per second. The ultrasonic signal passes through the patient and is reflected by the reflectors 24A and 24B (FIG. 2). The reflected signal is picked up by transducer 12 which converts it to an electrical signal. This electrical signal fed via line 20, matrix 32, line 92 to AGC amplifier 110. The output of the AGC amplifier is fed to the detector 114. The shaped pulse from detector 114 is fed via OR gate 204 to the input of binary counter 46. The leading edge of this pulse triggers binary counter 46 to the set state. Accordingly, a signal is transmitted via line 50, matrix 34, and line 52 to the control input of AND gate 72 which opens and establishes a path between lines 74 and 54. The 2 mHz. signal from oscillator 76 is thus fed into counter 42 wherein each cycle represents 0.5 microsecond.

The next audio pulse representing the reflected signal from the furthest target 24B passes from detector 114 through OR gate 204 and clears the binary counter 46 terminating the signal on line 50. Accordingly, AND gate 72 closes and a count has been accumulated in counter 42. In addition, as binary counter 46 is restored, it transmits a pulse via line 78 to counter 42 and display 80. When display 80 receives the pulse it accepts the signals on lines 82 representing the accumulated count. Since the propagation time in tissue is a constant (13.5 microseconds per centimeter) the accumulated count is a direct display of cervical dilatation. These signals can be fed to a D-to-A converter which drives a meter suitably calibrated in centimeters or they can be digitally processed to give a digital readout of the same.

While the cervical dilatation operation has been described for a single frequency wave packet reflected from two reflectors, two different frequency wave packets can be transmitted and reflected from different resonant frequency devices wherein the difference in the two round trip transit times of the two packets is a measure of the dilatation.

It should be noted that display 80 includes switching circuits responsive to the signals on line 45 to route the accumulated count signals to different display devices associated with each monitoring operation.

As various changes might be made in the embodiment of the invention herein disclosed without departing from the spirit thereof it is understood that all matter herein described shall be deemed illustrative and not limiting except as set forth in the appended claims.

I claim:

1. A method for simultaneously monitoring a plurality of physiological phenomena associated with childbirth by passing ultrasonic wave energy through the mother and the fetus therein and measuring changes in a plurality of characteristics of the ultrasonic wave energy when it leaves the mother's body, at least one of said phenomena being uterine contraction, said ultrasonic wave energy comprising pulses of wave energy and one of said measurements comprising measuring the changes in transit time of the pulses through the mother and fetus due to increased effective path length resulting from the uterine contractions.

2. The method of measuring uterine contraction during childbirth comprising the steps of transmitting pulses of ultrasonic energy through the female and the fetus and measuring changes in the transmit time of the pulses through the female and the fetus due to increased effective path length therethrough due to increased uterine cross-section caused by uterine contractions.

3. Apparatus for monitoring at least one physiological phenomenon during childbirth, comprising a first transducer for at least converting electric signals to sonic waves which is positionable on the body of a pregnant female in the region of the small of the back, a second transducer for at least converting sonic waves to electric signals which is positionable on the body of said female in the region of the umbilicus so that the path between said transducers traverses the female and the fetus, means for transmitting high frequency electric signals to said first transducer whereby said first transducer transmits ultrasonic wave energy toward said second transducer, means for measuring the characteristics of the electric signals emitted by said second transducer in response to received ultrasonic wave energy, one of said phenomena is fetal heart beat, said means for transmitting high frequency electric signals to the first transducer including means for transmitting signals of a known frequency, said measuring means including means for indicating the difference in the frequency of the transmitted high frequency electric signals and the frequency of the electric signals emitted by the second transducer in response to ultrasonic energy reflected from a fetal heart; said signal transmitting means including means for transmitting pulse packets of electric signals, said measuring means including means for heterodyning the transmitted high frequency electric signals emitted by the first transducer in response to ultrasonic energy reflected from said fetal heart and means for selecting the electric signals emitted by said heterodyning means having a frequency which is the difference in the frequencies of the heterodyned signals, another of said phenomena being uterine contraction, and said measuring means including means for measuring the time between the transmission of a pulse packet of high frequency electric signals and the time said second transducer emits an electric signal in response to receipt of the ultrasonic energy pulse associated with said pulse packet.

4. Apparatus for monitoring the physiological phenomena during childbirth, comprising a first transducer for at least converting electric signals to sonic waves which is positionable on the body of a pregnant female in the region of the small of the back, a second transducer for at least converting sonic waves to electric signals which is positionable on the body of said female in the region of the umbilicus so that the path between said transducers traverses the female and the fetus, means for transmitting high frequency electric signals to said first transducer whereby said first transducer transmits ultrasonic wave energy toward said second transducer, means for measuring the characteristics of the electric signals emitted by said second transducer in response to received ultrasonic wave energy, one of said phenomena is fetal heart beat, said means for transmitting high frequency electric signals to the first transducer includes means for transmitting signals of a known frequency, said measuring means including means for indicating the difference in the frequency of the transmitted high frequency electric signals and the frequency of the electric signals emitted by the second transducer in response to ultrasonic energy reflected from the fetal heart; said signal transmitting means including means for transmitting pulse packets of electric signals, said measuring means including means for heterodyning the transmitted high frequency electric signals emitted by said first transducer in response to ultrasonic energy reflected from said fetal heart and means for selecting the electric signals emitted by said heterodyning means having a frequency which is the difference in the frequencies of the heterodyned signals, another of said phenomena being uterine contraction, said measuring means further including means for indicating the difference in the frequency of the electric signals having said known frequency in one of said pulse packets and the frequency of the electric signals emitted by said first transducer in response to reflected ultrasonic energy, said frequency difference resulting from the Doppler effect caused by the movement of the fetal heart, and means for indicating the time between the transmission of another of said pulse packets and the pulse signal emitted by said second transducer in response to directly received ultrasonic energy, said time being related to the amount of contraction of the uterus.

9

5. Apparatus for monitoring at least one physiological phenomenon during childbirth, comprising a first transducer for at least converting electric signals to sonic waves which is positionable on the body of a pregnant female in the region of the small of the back, a second transducer for at least converting sonic waves to electric signals which is positionable on the body of said female in the region of the umbilicus so that the path between said transducers traverses the female and the fetus, means for transmitting high frequency electric signals to said first transducer whereby said first transducer transmits ultrasonic wave energy toward said second transducer, means for measuring the characteristics of the electric signals emitted by said second transducer in response to received ultrasonic wave energy, one of said phenomena is fetal heart beat, said means for transmitting high frequency electric signals to the first transducer including means for transmitting signals of a known frequency, said measuring means including means for indicating the difference in the frequency of the transmitted high frequency electric signals and the frequency of the electric signals emitted by the second transducer in response to ultrasonic energy reflected from the fetal heart; said signal transmitting means including means for transmitting pulse packets of electric signals, said measuring means including means for heterodyning the transmitted high frequency electric signals emitted by said first transducer in response to ultrasonic energy reflected from said fetal heart and means for selecting the electric signals emitted by said heterodyning means having a frequency which is the difference in the frequencies of the heterodyned signals, and further comprising means for measuring cervical dilation comprising ultrasonic energy reflector means adapted to be positioned on at least two different regions of the mouth of the cervix, at least one of said transducers being positioned in opposed relation to said reflector means to direct ultrasonic energy signals to said reflector means and receive ultrasonic energy signals therefrom, said measuring means including means for indicating the difference between the round trip transit time of a pulse of sonic energy between said one transducer and one of said reflectors and the round trip transit time of a pulse of sonic energy between said one transducer and the other of said reflectors for indicating cervical dilation.

6. A method of simultaneously monitoring a plurality of physiological phenomena associated with childbirth by passing ultrasonic wave energy through the mother and fetus therein and measuring changes in a plurality of characteristics of the ultrasonic wave energy when it leaves the body, at least one of the phenomena being cervical dilation, positioning ultrasonic reflectors on two different regions of the cervix of the mother, reflecting from said reflectors pulses of ultrasonic wave energy, and one of said measurements comprising measuring the difference in transit time of the ultrasonic pulses reflected from each region due to dilation of the cervix.

7. A method of simultaneously monitoring a plurality of physiological phenomena associated with childbirth by passing ultrasonic wave energy through the mother and fetus therein, and measuring changes in a plurality of characteristics of the ultrasonic wave energy when it leaves the body, one of said phenomena being fetal heart beat, said ultrasonic wave energy being transmitted during known periods of time as pulsed wave of known frequency which passes through the mother and fetus, and one of said measurements comprising measuring changes in the frequency of the ultrasonic wave due to the Doppler effect caused by movement of a fetal heart valve; another of said phenomena being uterine contraction, transmitting ultrasonic pulses of wave energy during other known periods of time, and another of said measurements comprising measuring changes in transit time of the pulses through the mother and fetus due to increased effective path length therethrough due to increased uterine cross-section caused by uterine contraction.

8. A method of simultaneously monitoring a plurality of physiological phenomena associated with childbirth by passing ultrasonic wave energy through the mother and fetus therein and measuring changes in a plurality of characteristics of the ultrasonic wave energy when it leaves the body, one of said phenomena being fetal heart beat, said ultrasonic wave energy being transmitted during known periods of time as a pulsed wave of known frequency which passes through the mother and fetus, and one of said measurements comprises measuring changes in the frequency of the ultrasonic wave due to the Doppler effect caused by movement of a fetal heart valve; another of said phenomena being cervical dilation, transmitting the ultrasonic wave energy as pulses of wave energy during other known periods of time, positioning ultrasonic reflectors on two different regions of the mouth of the cervix, reflecting ultrasonic energy therefrom, and another of said measurements comprising measuring the difference in transit time of the pulse reflected from each reflector due to dilation of the cervix.

9. A method of simultaneously monitoring a plurality of physiological phenomena associated with childbirth by passing ultrasonic wave energy through the mother and fetus therein and measuring changes in a plurality of characteristics of the ultrasonic wave energy when it leaves the body, one of said phenomena being uterine contraction, said ultrasonic wave energy being transmitted as pulses of wave energy during known periods of time, one of said measurements comprising measuring changes in transit time of the pulses through the mother and fetus due to increased effective path length therethrough due to increased uterine cross-section caused by uterine contraction and another is cervical dilation, transmitting the ultrasonic wave energy as pulses of wave energy during other known periods of time, positioning ultrasonic reflectors on two different regions of the cervix, reflecting the ultrasonic energy therefrom, another of said measurements comprising measuring the difference in transit time of the pulse reflected from each reflector due to dilation of the cervix.

10. A method of simultaneously monitoring a plurality of physiological phenomena associated with childbirth by passing ultrasonic wave energy through the mother and fetus therein and measuring changes in a plurality of characteristics of the ultrasonic wave energy when it leaves the body, one of said phenomena being fetal heart beat, said ultrasonic wave energy being transmitted during known periods of time as a pulsed wave of known frequency which passes through the mother and fetus, one of said measurements comprising measuring changes in the frequency of the ultrasonic wave due to the Doppler effect caused by movement of a fetal heart valve; another of said phenomena being uterine contraction, transmitting ultrasonic wave energy as pulses of wave energy during other known periods of time, another of said measurements comprising measuring changes in transit time of the pulses through the mother and fetus due to increased effective path length therethrough due to increased uterine cross-section caused by uterine contraction; and another phenomena being cervical dilation, transmitting the ultrasonic wave energy as pulses of wave energy during still other known periods of time, positioning ultrasonic reflectors on two different regions of the cervix, reflecting the ultrasonic energy therefrom, and another of said measurements comprising measuring the difference in transit time of pulses reflected from each reflector due to dilation of the cervix.

11. The method of measuring cervical dilation comprising the steps of positioning ultrasonics reflectors on two different regions of the mouth of the cervix of a pregnant female, transmitting pulses of ultrasonic energy toward said reflectors, reflecting the pulses of ultrasonic energy, and measuring the difference in the time of receipt of the ultrasonic pulses reflected from said reflectors.

References Cited

UNITED STATES PATENTS

| | | | |
|---|---|---|---|
| 2,763,153 | 9/1956 | Simjian | 128—2X |
| 2,815,748 | 12/1957 | Boucke | 128—2.05 |
| 3,156,110 | 11/1964 | Clynes | 128—2UX |
| 3,273,559 | 9/1968 | Evans | 128—2 |
| 3,379,901 | 4/1968 | Richards | 128—2.05X |

OTHER REFERENCES

Crawford et al.: "IRE Transactions on Medical Electronics," vol. ME6, No. 3, September 1959, pp. 141–146.

Satomura: "Journal of the Acoustical Society of America," vol. 29, No. 11, November 1957, pp. 1181–1185.

WILLIAM E. KAMM, Primary Examiner

U.S. Cl. X.R.

128—2R, 24A